Sept. 27, 1966  F. BIEDERMANN ETAL  3,274,914
CAMERA FOCUSING DEVICES Filed June 10, 1964  6 Sheets-Sheet 1

INVENTORS
FRIEDRICH BIEDERMANN
GÜNTER FAUTH
BY FRANZ JAKOB
HANS-PETER SIMSON
ERWIN VON WASIELEWSKI

Sept. 27, 1966 F. BIEDERMANN ETAL 3,274,914
CAMERA FOCUSING DEVICES
Filed June 10, 1964 6 Sheets-Sheet 2

INVENTORS
FRIEDRICH BIEDERMANN
BY GÜNTER FAUTH
FRANZ JAKOB
HANS-PETER SIMSON
ERWIN VON WASIELEWSKI

Sept. 27, 1966  F. BIEDERMANN ETAL  3,274,914
CAMERA FOCUSING DEVICES

Filed June 10, 1964  6 Sheets-Sheet 4

201 202 203 204 205 206     207 208 209 210 211 212

201 202 203 204 205 206     207 208 209 210 211 212

INVENTORS

FRIEDRICH BIEDERMANN
BY  GÜNTER FAUTH
FRANZ JAKOB
HANS-PETER SIMSON
ERWIN VON WASIELEWSKI

United States Patent Office 3,274,914
Patented Sept. 27, 1966

3,274,914
CAMERA FOCUSING DEVICES
Friedrich Biedermann, Günter Fauth, and Franz Jakob, Unterhaching, Munich, Hans-Peter Simson, Tutzing, and Erwin V. Wasielewski, Munich, Germany, assignors to Agfa Aktiengesellschaft, Leverkusen, Germany
Filed June 10, 1964, Ser. No. 374,116
Claims priority, application Germany, June 21, 1963, A 43,384
26 Claims. (Cl. 95—44)

The present invention relates to range finders.

More particularly, the present invention relates to camera range finders of the type where a pair of optical means are respectively situated adjacent the junctions between the base of a predetermined triangle and the sides thereof, where these sides of the triangle respectively coincide with the optical axes of the pair of optical means and intersect distant from the base at the subject which is to be photographed.

This general type of range finder is well known and is conventionally used in a camera where one of the optical means forms part of the viewfinder for providing one image of the subject while the other optical means superimposes a second image of the subject on the one image thereof which is visible in the viewfinder, so that the operator knows that when precise superposition of the images is achieved the range finder has properly determined the distance between the subject and the camera. It is conventional, for example, to move the adjustable optical means of the range finder during focusing of the objective of the camera so that when the latter is focused until superposition of these images is achieved the operator knows that the objective is properly focused on the subject.

One of the primary objects of the present invention is to provide for a structure of the above type a means for automatically determining when the objective is properly focused on a given subject.

Another object of the present invention is to provide for a structure of the above type an automatic means for automatically focusing the objective on a subject with a range finder of the type set forth above.

Still another object of the present invention is to provide a structure which enables the operator to manually focus the objective with an indication automatically being given to the operator of when proper focusing is achieved.

It is furthermore an object of the invention to provide a structure which, for example, will automatically focus the objective in response to actuation of a camera element such as a shutter release structure, in such a way that precise focusing will be achieved before the actual exposure is made.

Furthermore, it is an object of the present invention to provide a structure which is capable of automatically determining both the magnitude and the direction in which the objective must be adjusted for achieving precise focusing thereof on a given subject.

Furthermore, it is an object of the invention to provide a structure which enables the operator simply to release the objective for automatic movement from a given starting position until the objective is automatically stopped at a position where it is precisely focused on a given subject.

With the above objects in view the invention includes, in a range finder, a pair of optical means respectively situated adjacent the junctions between the base of a predetermined triangle and the sides thereof, these sides of the triangle respectively coinciding with the optical axes of the pair of optical means and intersecting distant from the base of the triangle at the subject. In accordance with the present invention a pair of photosensitive transducers respectively receive light from the pair of optical means and are connected into a suitable electrical circuit, preferably a balancing bridge circuit, so that when balance of the latter circuit is achieved an indication is given that the range finder has been properly set to determine the distance between the subject and the camera, and the adjustment of the range finder can be coupled in a number of different ways with the objective of the camera for automatically focusing the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
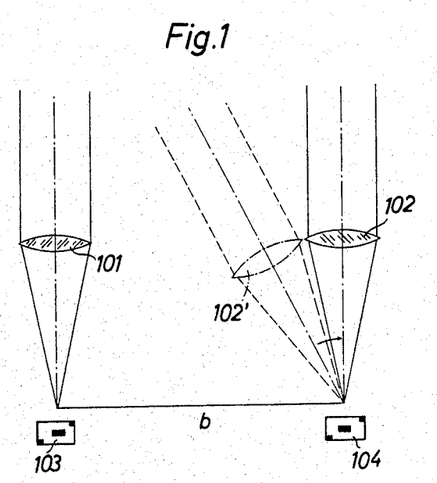
FIG. 1 schematically illustrates a range finder structure according to the present invention.

Referring now to FIG. 1, there is illustrated therein a pair of optical means 101 and 102 in the form of a pair of range finder objectives capable of providing sharp images of a subject located from the range finder at a distance which ranges from somewhat less than 1 meter up to infinity. The section of the subject which can be imaged with this structure is determined by the directions of the optical axes, the focal lengths of the objectives 101 and 102, and the limits of the images produced thereby. The pair of optical means 101 and 102, which have the same properties, are respectively situated adjacent the junctions between the base $b$ of a predetermined triangle and the sides of this triangle, the sides of the triangle respectively coinciding with the optical axes of the pair of optical means 101 and 102. In the illustrated example the optical means 101 is stationary while the optical means 102 is turnable. While the objectives 101 and 102 are situated adjacent the junctions between the base and sides of the triangle, actually the focal points of the objectives are situated precisely at the ends of the base $b$, and the objective 102 is turnable about an axis passing through its focal point and normal to the plane which includes the base $b$ and the sides of the triangle, this adjustment being through a relatively small angle although it is shown on an enlarged scale in FIG. 1 for the sake of clarity. In the event that the subject is located at infinity, the sides of the triangle, or in other words the pair of optical axes of the pair of optical means 101 and 102, will intersect at infinity, which is to say they will be parallel to each other, and in this case both of the imaging systems 101 and 102 will provide the same images. As the distance between the subject and the range finder diminishes to a distance which is less than infinity, the optical axis of the optical means 102 must be turned toward the optical axis of the optical means 101 to an increasing extent as the distance between the subject and range finder diminishes, in order for the image provided by the optical means 102 to be the same as that which is provided by the optical means 101.

The above-described system of FIG. 1 is the conventional well known range finder system which is normally used where an image provided by the objective 102 will, for example, be superimposed upon an image provided by the objective 101. However, in contrast to this latter well known manner of using the system shown in FIG. 1, with the present invention there is no superposition of the images in order to determine their coincidence, and the point where proper focusing is achieved is determined in an entirely different manner with the present invention.

According to the invention a pair of photosensitive transducers 103 and 104 are respectively arranged for receiving light from the pair of optical means 101 and 102, so that the images provided by the pair of optical means instead of being superimposed are transmitted to the photosensitive transducers 103 and 104, respectively, and these transducers are identical with respect to their sensing of dark and light contrast so that they provide electrical impulses for controlling the range finder. In this way it is possible to achieve a semiautomatic or full automatic range finder control, if the adjusting of the optical means 102 is mechanically coupled with the picture-taking objective of a camera, and at the same time where with the aid of the electronic transducers 103 and 104 both of the imaging systems are adjusted on precisely the same section of the subject. In the actual construction the pair of photosensitive transducers 103 and 104 are situated precisely in the focal planes of the objectives 101 and 102, respectively, but for the sake of clarity they are shown in FIG. 1 turned through 90° from these planes. These transducers can be in the form of photocells or photosensitive resistors.

Figure 2:
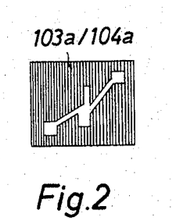
FIGS. 2–4 respectively illustrate different embodiments of photosensitive transducers of the invention.

The simplest arrangement of the structure of the invention is one where the photosensitive transducers 103a, 104a are identical as shown in FIG. 2 and are respectively situated to cooperate with the pair of optical means 101 and 102 in the manner shown in FIG. 1 for respectively receiving the entire images provided by the pair of optical means, but where through suitable covering only predetermined portions of the sensitive surfaces of the transducers are effective. For example, the covering shown in FIG. 2 may be such that only the unshaded area of each of the transducers is effective, and the total resistance of the effective area of the transducer 103a may be $R_1$, while the resistance of the identical effective area for the transducer 104a is $R_2$. When the resistance of the sensitive area of the transducer 104a precisely equals that of the sensitive area of the transducer 103a the pair of transducers will "see" precisely the same image sections and thus the range finder will be properly set at the distance between the subject and the range finder, and if a camera objective is adjusted during movement of the movable optical means 102, this objective will be precisely focused when the resistance $R_2$ equals the resistance $R_1$. Of course, if desired, the shaded area shown in FIG. 2 may be the effective area while the unshaded area may be covered.

Figure 3:
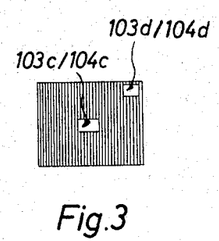
Figure 4:
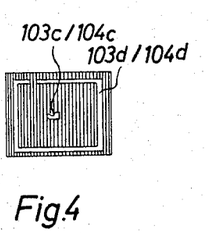

A further possibility of the invention is to provide for the transducers two or more completely independent effective areas. For example, as is shown in FIG. 3, the pair of identical transducers may have identically effective separate areas 103c and 103d for the transducer which is located at the focal plane with the objective 101, and the areas 104c and 104d for the transducer situated at the focal plane of the objective 102. These identical sensitive sections of the pair of transducers are situated at predetermined locations within the field of the image provided by the objectives. Also, FIG. 4 shows another arrangement where the sensitive areas 103c and 103d of one transducer are identical with the areas 104c and 104d of the other transducer, but these areas have a completely different configuration and size from the areas of the transducers illustrated in FIG. 3. The reason why it is preferred to use transducers as shown in FIGS. 2–4, rather than transducers which are sensitive over their entire areas, is that during turning of the optical means 102 through its entire range it is possible to have at more than one position the same light relationships for a given subject, while with the arrangements as shown in FIGS. 2–4 the danger of achieving precisely the same electrical signals for both transducers at more than one position of the transducer associated with the movable optical means is very greatly diminished. The greater the number of independent sensitive areas of the pair of transducers the less the possibility of the transducer 104 providing in more than one position of the optical means 102 the same impulse as the transducer 103.

Where each of the identical transducers has a pair of separate sensitive areas as shown, for example, in FIGS. 3 and 4, these distinct areas of each transducer may act as a separate pair of variable photosensitive resistors, so that with a given distribution of light and dark areas on the transducers achieved with a system as shown in FIG. 1 there will be predetermined resistance values $R_1$ and $R_2$ for the areas 103c and 103d of the transducer 103 and resistances $R_3$ and $R_4$ for the identical pair of areas of the transducer 104. In such a case the resistance $R_1$ for the central area 103c of the transducers of FIGS. 3 and 4, for example, will correspond to the resistance $R_3$ for the same central area 104c of the transducer 104, while the resistance $R_2$ of the remaining sensitive area 103d will correspond to the resistance $R_4$ of the identical area 104d of the other transducer. In the event that both of the transducers simultaneously receive the same images, then resistances $R_1$ and $R_2$ will be respectively equal to the resistances $R_3$ and $R_4$, and the ratio between resistances $R_1$ and $R_3$ will be equal to the ratio between resistances $R_2$ and $R_4$. However, in the event that the pair of photosensitive transducers do not receive precisely the same images, then even though, for example, the resistance $R_2$ happens to equal the resistance $R_4$, the resistance $R_1$ will not equal the resistance $R_3$, or another possible situation is where when the image of the transducers are not identical the resistance $R_1$ may equal the resistance $R_3$, but the resistance $R_2$ will not equal the resistance $R_4$, and of course a third case is possible where when the pair of transducers do not receive the same images the resistance $R_1$ does not equal the resistance $R_3$ and the resistance $R_2$ does not equal the resistance $R_4$. In any of the latter three cases it is clear that the ratio between the resistances $R_1$ and $R_3$, on the one hand, and the resistances $R_2$ and $R_4$ on the other hand, will not be equal. This principle of balancing the pairs of resistances of the photosensitive transducers can be used for controlling the range finder by hand. For example, where each of the photosensitive transducers are in the form of photosensitive resistors each having a pair of identical resistance areas as described above, the objective 101 of the range finder can be sighted upon an important part of the subject, as for example with a suitable viewfinder which utilizes the objective 101 for the viewfinder objective in order to view with the viewfinder an important part of the subject so that the extension of the optical axis of the objective 101 passes through the center of the subject which is to be photographed. In accordance with the particular light contrast of the subject there will be provided at the transducer portions 103c and 103d resistance values $R_1$ and $R_2$ which are the reference resistances with which the resistance values of the equal transducer areas of the transducer 104 are to be matched. In the starting position the optical axis of the objective 102 will of course be parallel to the optical axis of the objective 101, and an objective 105 of a camera, as shown schematically in FIG. 5, may be mechanically coupled in a known manner with the objective 102 so that when the latter is adjusted the objective 105 is also adjusted. Initially all three optical axes, namely the optical axes of the objectives 101 and 102 and of the objective 105 will be parallel. However, if the subject which is to be photographed is located nearer than infinity from the camera, the objectives 101 and 102 will not provide matching images. Thus, the resistance $R_3$ of the central area 104c will not correspond to the resistance $R_1$ of the central area 103c, and the same of course will very likely apply for the resistances $R_4$ and $R_2$. In order to measure the relationship between these resistances it is possible to use either a single or a double balancing bridge circuit. Where the balancing bridge circuit used direct current the resistances $R_1$ and $R_3$ are opposed to each other, and the resistances $R_2$ and $R_4$ are opposed to each other so that balance will be achieved, in a circuit similar to a Wheatstone bridge circuit, only when the resistances $R_1$ and $R_2$ are respectively equal to resistances $R_3$ and $R_4$. However, with such an arrangement there is a danger that a false adjustment will be provided even when the transducers do not receive precisely the same images, in the event that the bridge circuits operate not according to a zeroing principle, but rather according to a minium potential, for example. It is therefore preferred to use a pair of independent balancing bridge circuits in which in the first circuit the pair of complementary resistances $R_1$ and $R_3$ are situated while in the second bridge circuit the complementary pair of resistances $R_2$ and $R_4$ are compared against each other. The remaining resistances of such a pair of bridge circuits are fixed resistances, as is well known in such circuits. When both of these circuits are provided at their central zeroing branches with galvanometers, the zeroing of the galvanometers will indicate when balance has been achieved. Both of the galvanometers with such a construction can have their images reflected into the viewfinder so as to be visible therein together with the viewfinder image. By turning the focusing ring of the objective 105 the objective 102 which is coupled thereto will be adjusted so as to have the inclination of its optical axis changed in the manner described above in connection with FIG. 1, until the objective 102 receives precisely the same image as the objective 101, and the operator will know when this matching of the images has been achieved when he sees that both of the pointers of the galvanometers whose images are visible in the viewfinder have reached their zero positions where these pointers are aligned with suitable zeroing indexes. Such a position is shown, for example, in FIG. 1 where the objective 102 has been turned to the dot-dash line position 102'.

Figure 5:
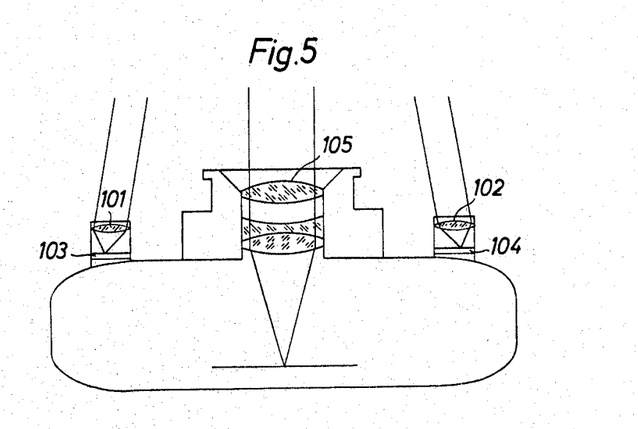
FIG. 5 shows one possible optical arrangement according to the invention in a schematic manner.

In general it is difficult to find photosensitive resistors which throughout their entire range of sensitivity have a completely uniform operating characteristic. Therefore, it will not be possible to balance the bridge circuit to an absolute zero, but rather the circuit will be balanced to a minimum potential. As a result of this tolerance there will be a slight lack of focus, but because of the depth of field of the camera objective 105 this slight lack of focus is of no consequence. In order to render this minimum potential practically independent of the average light intensity of the objective, a further photosensitive resistor can be connected in parallel with the individual bridge circuits, and with increasing light intensity this photosensitive resistor will damp the sensitivity of the bridge circuits. Moreover, there should be a fixed resistor connected to the bridge circuits, this fixed resistor itself providing a certain damping.

With a fully automatic control of the range finder and objective the same constructive principles apply as with a manual control, except that in a case of fully automtic control the zeroing branches of the balancing bridge circuits are provided with direct current relays rather than with galvanometers. Thus, where the galvanometers are viewed by the operator either directly or through images thereof so as to manually set the structure, the direct current relays will automatically open, for example, when balance is achieved so as to stop the operation of a driving motor, for example. Of course, if necessary the zeroing current can be amplified. Moreover, instead of a mechanical system it is also possible to use a transistorized circuit. The use of two direct current bridge circuits will enable each of the relays of the circuits to control a switch for turning the structure on and off, and in the unbalanced condition this switch is closed and closes the balancing bridge circuits. Both of these switches are arranged in parallel and connect the driving motor for adjusting the objective 102 with the battery. The motor will only stop operating when both switches are open, and this is only the case when balance is achieved so that the objective is necessarily in focus on the subject. The contact switch arrangement of the motor is so arranged that after the shutter release of the camera is actuated, so that an exposure has been made and a cycle of operations has been completed, there is an automatic return of the objective 102 to its starting position, where it is set at infinity, for example.

Figure 6A:
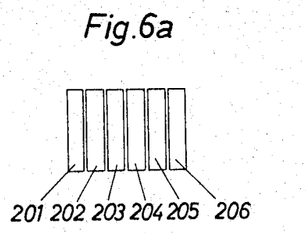
FIGS. 6a and 6b respectively illustrate the manner in which a pair of photosensitive transducers of the invention may be divided up into separate sections.
Figure 6B:
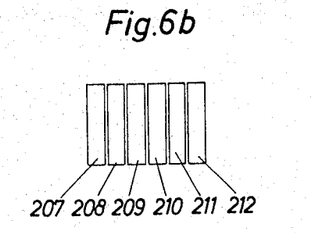

It is also possible to provide an arrangement as shown in FIG. 5 where both of the objectives 101 and 102 are fixed with their optical axes either parallel to each other or at a certain angle of inclination with respect to each other, and with such a construction the principle of the invention is as follows:

With such an arrangement the pair of photosensitive transducers 103 and 104 have a construction which enables them, when connected into a suitable circuit, to convert the parallax into an electrical impulse of a magnitude which corresponds to the degree of parallax, so that this impulse can then be used, after amplification if necessary, to actuate the structure for adjusting the setting of the picture-taking objective 105. In order to be able to convert the parallax into an electrical impulse, the pair of photosensitive transducers 103 and 104 have an identical construction, are in the form of, for example, photosensitive resistors, and are each composed of a plurality of vertical strips which respectively function as individual measuring elements which are for he most part independent of the neighboring strips, and for this purpose separate electrodes may be used, for example. The greater the number of these individual strips the more accurate will be the sensing of the parallax. In order to simplify the illustration of the invention it is assumed in the following description that each photosensitive resistor is composed only of six strips which are independent of each other, as indicated in FIGS. 6a and 6b where the total number of strips are indicated at 201–212 for the pair of photosensitive transducers each of which has six of these strips. The twelve strips are electrically interconnected with six small batteries and twelve balancing resistors in the circuit which is illustrated in FIG. 7.

Figures 7, 8:
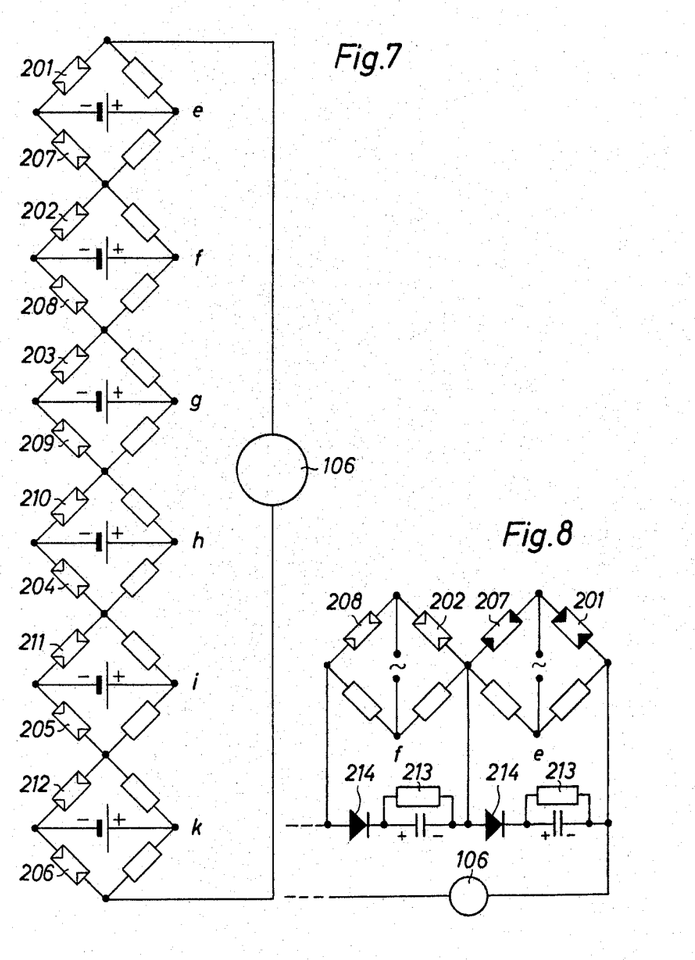
FIG. 7 is a wiring diagram of balancing bridge circuits for the structure of FIGS. 5, 6a and 6b.
FIG. 8 fragmentarily illustrates another embodiment of a circuit capable of being used with the structure of FIGS. 5, 6a and 6b.

As may be seen from FIG. 7, there are six balancing bridge circuits $e$, $f$, $g$, $h$, $i$ and $k$ which are connected in series in the manner illustrated and in which the several strips 201–212 of the pair of transducers shown in FIG. 6a and 6b are included in the manner illustrated. The individual responses of the several balancing bridge circuits are additively collected into a total potential which supplies the galvanometer 106 but which can be evaluated in any other suitable way. The relationship between these bridge circuits is such that with a completely uniform exposure to light of all of the photosensitive resistors all of the individual balance bridge circuits are in balance.

Figure 9A:
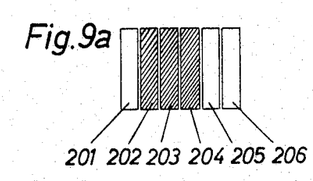
FIGS. 9a, 9b, 10a and 10b, respectively, illustrate various manners in which the transducers of FIGS. 6a and 6b can be exposed to light.
Figure 9B:
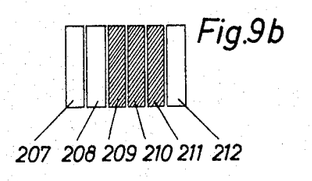
Figure 10A:
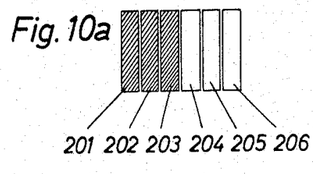
Figure 10B:
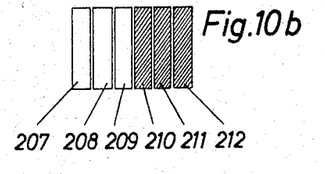

Assuming now that a relatively dark subject is located relatively close to the camera in front of a bright background situated at infinity, then the photo-sensitive resistor strips on which this relatively dark subject is imaged will have a higher resistance than the others, and in this connection reference may be had to FIGS. 9a and 9b which respectively illustrate the manner in which the subject can be imaged under these circumstances so that in the transducer 103 the strips 202–204 are darker than the remaining strips while in the transducer 104 the strips 209–211 are darker than the remaining strips. Because of the parallax of the imaging of the subject on the pair of photosensitive transducers, the darker strips are not only those which correspond to each other but also those which do not correspond with each other. In other words the several strips 201–206 respectively correspond to the strips 207–212, and it will be seen that while the strips 203 and 204 and the strips 209 and 210 which respectively correspond to the strips 203 and 204 are all dark, nevertheless the strip 202 which corresponds to the strip 208 is dark while the strip 208 is light, and in much the same way the strip 205 is light while the strip 211 which corresponds thereto is dark. This distribution of the light over the strips is the result of the parallax. The strips 202 and 208, which are respectively light and dark in the example shown in FIGS. 9a and 9b, are located in the balancing bridge circuit f, shown in FIG. 7, while the strips 205 and 211 which are respectively light and dark, are located in the balancing bridge circuit i. These balancing bridge circuits f and i are so arranged that under these conditions there will be a flow of current in the outer circuit through the galvanometer, the flow taking place from the balancing bridge circuit e toward the balancing bridge circuit k. On the other hand, if there should be a relatively bright subject near the camera and located in front of a relatively dark background at infinity, then the above-described effects which are illustrated in FIGS. 9a and 9b will become reversed and the flow of current will also be reversed although of the same magnitude, so that in the galvanometer the same magnitude of current will be sensed but the direction of flow will be opposite. If the relatively dark object becomes situated closer to the camera then the degree of parallax will become greater, and the result may be that illustrated in FIGS. 10a and 10b where there is a complete lack of correspondence in the lighting of the several photosensitive strips since in this case the first three strips 201–203 of the transducer 103 are dark and while simultaneously the first three strips 207–209 of the transducer 204 are light, and while the last three strips 204–206 are light the corresponding last three strips 210–212 of the other transducer are dark. Thus, in this case not only will the balancing bridge circuits f and i respond, but all six of the circuits will respond with the result that the galvanometer current will be correspondingly greater. On the other hand, if the subject is at infinity then all of the balancing bridge circuits will be in balance and the galvanometer will receive no current. Therefore, it is apparent that the magnitude (not the direction) of the movement of the galvanometer pointer is indicative of the distance of the subject from the camera. In other words, the magnitude of the current flowing through the galvanometer depends solely upon the distance of the subject from the camera. The only essential requirement for proper operation of the apparatus is that the imaged subject must have a certain degree of contrast with respect to the background and should also have a size great enough to enable it to extend to the center of the image, with any other distribution throughout the field of the image being also acceptable as long as the subject covers the central portion of the image. The electrical connection of the photosensitive resistor strips in the right and left halves of the image fields with the pair of fixed focus objectives 101 and 102 of FIG. 5 is such that their polarities are different so that the parallax effects of the right and left portions of the objectives do not cancel each other but instead add together. Thus, it will be seen that in the circuits e, f and g, in FIG. 7, the strips 201, 202 and 203 are at the upper left branches while the strips 207, 208, and 209 of the other transducer are at the lower left branches, while in the circuits h, i, and k, it is the strips 210, 211, and 212 of the transducer 104 which are at the upper left branches while the strips 204, 205 and 206 of the transducer 103 are at the lower left branches, so as to provide this change in polarity which results in the adding rather than the cancellation of the parallax effects.

Figure 11:
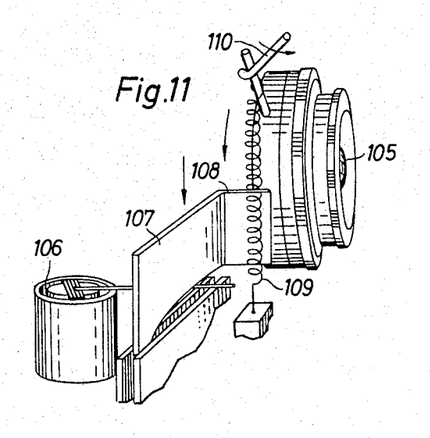
FIG. 11 schematically illustrates in a perspective view one possible embodiment of a mechanical structure for automatically determining the focusing of an objective.

FIG. 11 illustrates one possible embodiment of a structure for transmitting the electrical control impulse to the objective. In FIG. 11 the galvanometer 106 is scanned in a known way. As is diagrammatically indicated in FIG. 11 the pointer of the galvanometer 106 is capable of moving freely over a pair of supports between which the scanning member 107 can move as indicated in FIG. 11, and this scanning member 107 will move down to engage the pointer of the galvanometer so that the angular position of the pointer of the galvanometer will determine the elevation of the scanning member 107 in the manner which is well known in the art. Either the scanning member 107 itself or an element fixed thereto forms a stop 108 which thus will have its position determined by the anngular position of the moving coil of the galvanometer, and this stop will limit the extent of adjustment of the objective to a value which will provide the required accurate focusing of the objective on the subject. The movement of the objective itself is brought about at each exposure by a spring 109 which is released to move the objective when a stopping device 110 is moved to a release position as indicated by the arrow shown at the upper part of FIG. 11. Thus, in order to automatically focus the objective the operator will simply move the holding member 110 to a release position releasing the objective to the force of the spring 109 which turns the member formerly engaged by the hook 110 into engagement with the stop 108 whose position is determined by the exposure of the pair of photosensitive transducers. After each exposure the structure which advances the film of the camera in a manner well known in the art also will return the objective 105 to its infinity position thus tensioning the spring 109 and the releasable holding member 110 will again engage the pin to which the upper end of the spring 109 is fixed in FIG. 11, so that at each exposure the objective is ready to be released to the spring 109 which automatically focuses the objective in the manner described above.

The above described principle of sensing the distance of the subject from the camera and automatically focusing the camera is capable of many variations. The focusing control is not tied in with the horizontal base of a triangle as is the case with the arrangement as shown in FIG. 1 and described above. Therefore, this construction can be used also in motion picture cameras where the base of the triangle can extend vertically and the photosensitive transducers can in such an arrangement be provided with horizontally extending strips.

Instead of supplying the electrical current to a galvanometer, the electrical current can control a servomotor which adjusts the objective so as to focus it at the required distance setting, and with such a construction both the galvanometer and the scanning structure can be eliminated.

Instead of the above-described fixed mounting of the pair of fixed-focus objectives with the photosensitive transducers behind the latter, respectively, both of the systems can be mounted for pivotal movement and the turning movement thereof can be coupled with the adjustable main objective. Then the controlling current which is derived from the parallax acts with full intensity on the objective only during the initial part of the movement thereof and the impulse for adjusting the objective disappears at the end of the movement thereof. Thus, with such an arrangement instead of a control structure according to the magnitude of the impulse there is instead an adjustment brought about directly from the magnitude of the impulse until the impulse disappears.

The construction of FIG. 5 with a pair of fixed distance-sensing or range-finding objectives is particularly suitable, with the electrical connections of FIG. 7, for motion picture cameras when the latter are used for photographing moving objects since the controlling current increases as the subject approaches the camera and decreases as the subject becomes more distant from the camera.

The direction of current flow depends upon the nature of the contrast between the subject and background, as is apparent from the above discussion. This property permits the control of the focus of the objective also to be used for introducing desired corrections of the structure which controls the exposure of the film.

Moreover, it is possible, as indicated in FIG. 8, to supply the individual balancing bridge circuits with alternating current and then to rectify the current with two-way rectifiers or with Gratz rectifiers. This arrangement has the advantage that not only for bright subjects against dark backgrounds but also dark subjects against light backgrounds the direction of movement of the moving coil of the galvanometer will be the same. Inasmuch as the effects of all subject limitations always add to each other and do not cancel each other, the structure of FIG. 8 will have an increased sensitivity as compared to the embodiment of FIG. 7. In FIG. 8 the resistors which are fixed are not indicated. FIG. 8 does illustrate, however, the capacitors 213 and the detectors 214.

Figure 12:
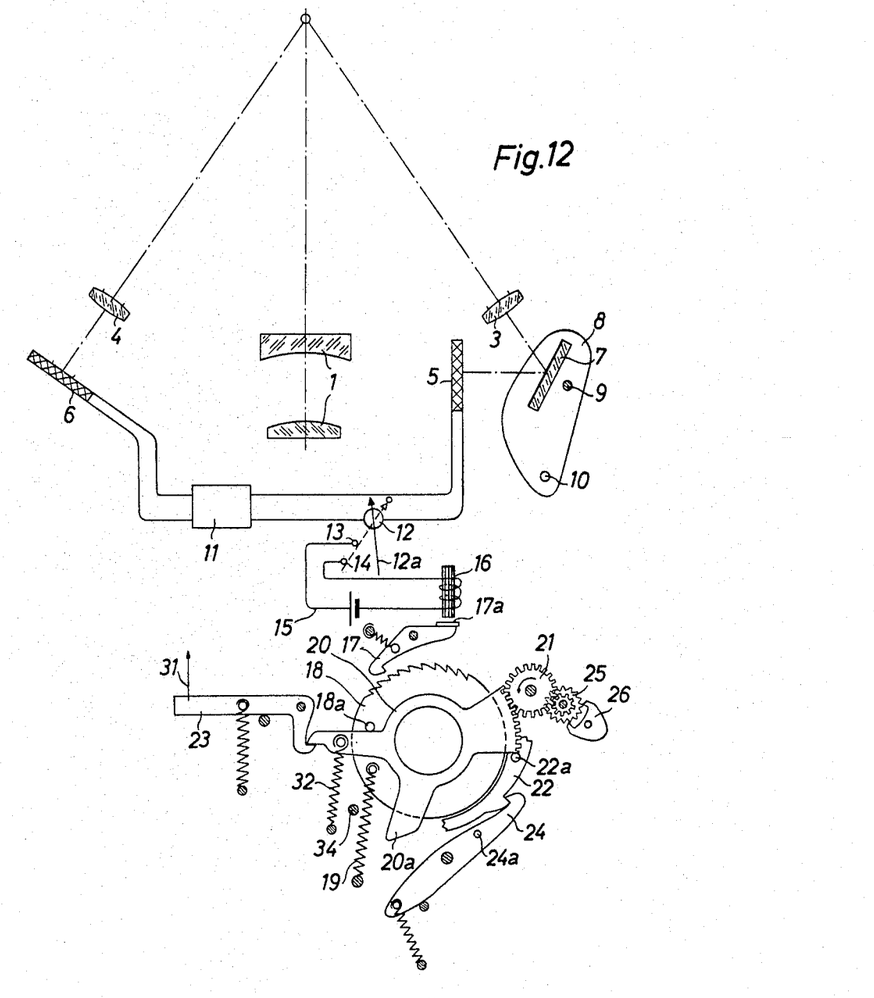
FIG. 12 is a schematic illustration of another embodiment of a structure for automatically determining the focus of a camera objective.
Figure 13:
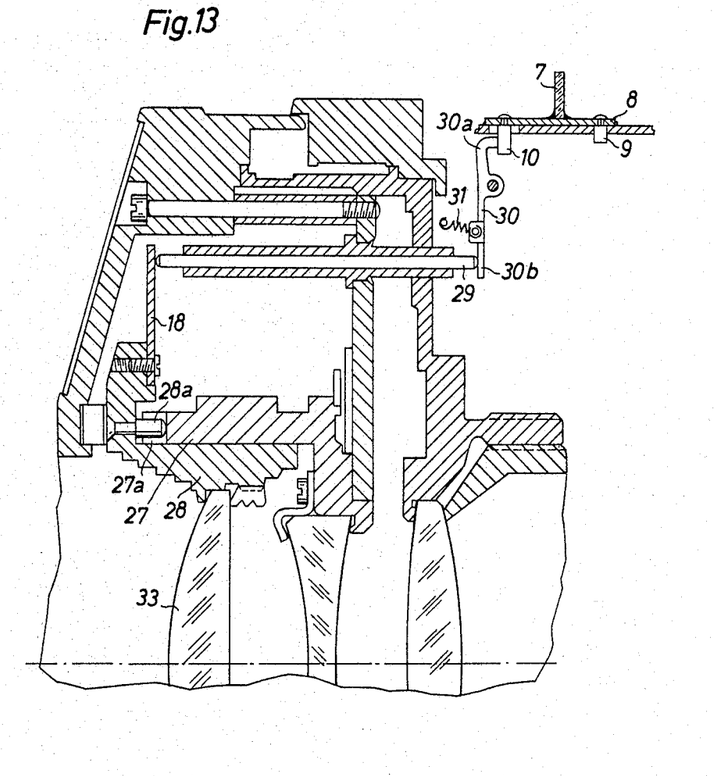
FIG. 13 is a fragmentary sectional view on an enlarged scale, taken in a plane which includes the optical axis of the camera objective of FIG. 12, and indicating in detail the mechanical transmission between an optical means of the range finder and the camera objective.

FIGS. 12 and 13 illustrate a further embodiment of a control structure according to the invention. In this embodiment the finder 1 is sighted on the subject 2 by the operator in such a way that the cross hairs of the reticle have their intersection in alignment with the object which is seen through the finder 1, so that, for example, the lenses 3 and 4 transmit sections of images of the subject to the pair of photosensitive resistors 5 and 6. A reflector 7, in the form of a suitable mirror, for example, is fixedly carried by a plate 8 which is supported for turning movement about a stationary pin 9. The pin 10 is fixed to the plate 8 and serves to transmit the adjusting movement from the shutter of FIG. 13 in a manner described in greater detail below. The electrical circuit 11 is diagrammatically indicated in FIG. 12 and serves to influence the galvanometer 12. Contacts 13 and 14 are placed in electrical connection with each other by the pointer of the galvanometer when this pointer reaches its zero position, and the closing of the circuit in which the contacts 13 and 14 are located enables the circuit 15 to energize the solenoid 16, the circuit 15 which includes the contacts 13 and 14 and the solenoid 16 being supplied with current from a suitable battery, as shown diagrammatically in FIG. 12. The energizing of the solenoid 16 will cause the armature 17a of a pawl 17 to be pulled toward the electromagnet 16, with the result that the pawl 17 will cooperate with the teeth of an adjusting ring 18. This adjusting ring 18 carries a pin 18a which is fixedly mounted on the ring 18 which is urged by a spring 19 in a direction which places the pin 18a in engagement with the tensioning ring 20. This tensioning ring 20 is in mesh with a pinion 21 which turns in a counterclockwise direction, as shown by the arrow in FIG. 12, in order to displace the ring 20 to its tensioned position, and in this way the pin 22a which is connected to the driving spring of the shutter assembly is also displaced for tensioning the shutter of the camera. The tensioning ring 20 is held in its tensioned position by a release member 23, and the shutter ring 22 is releasably held in its tensioned position by the tooth of a release lever 24 which fixedly carries a pin 24a. The pinion 21 is operatively connected through a suitable gear with an escapement wheel 25 which cooperates with the anchor 26.

Referring to FIG. 13, it will be seen that the tube 27 of the objective and shutter assembly carries one or more axial focusing cams which serve to shift the lens carrier 28 of the front lens axially. The ring 18 is fixed with the lens carrier 28, and a pin 28 forms a cam follower which rides along the focusing cam 27a of the tube 27. The motion transmitting lever 30 shown at the uper right portion of FIG. 13 is supported for turning movement about a stationary pivot and is acted upon by a spring 31 so that the lower end 30b of the lever 30 engages the right end of an elongated axial pin 29 whose left end engages the ring 18, this pin 29 being supported for free axial movement, and in this way the axial movement of the ring 18 is transmitted to the end 30a of the lever 30, this end 30a engaging the pin 10 which is fixed to the plate 8 which carries the reflector 7.

The above-described structure of FIGS. 12 and 13 operates in the following manner:

After an exposure has been made, the conventional film transporting structure will advance the next film frame which is to be exposed into the focal plane in alignment with the optical axis of the objective, as is well known in the art, and this film transporting structure acts, for example, to turn the pinion 21 so as to turn the ring 20 in the tensioning direction until the ring 20 reaches the tensioned position illustrated in FIG. 12. In this way the pin 22a and the shutter ring 22 are displaced by the ring 20 so as to tension the shutter. At the same time the adjusting ring 18 is turned in a direction which tensions the spring 19 by engagement of an arm of the ring 20 with the pin 18a which is carried by the ring 18, so that the transmission train which includes the axially movable pin 29, the transmitting lever 30, the plate 8, and the reflector 7, and in this way all of the parts are adjusted so that they have a limiting position where the objective is focused at infinity. In order to release the structure for operation the operator will turn the release lever 23 in the direction of the arrow 31 so that the tensioned ring 20 will now be turned in a counterclockwise direction by the spring 32, and now the transmission train which includes the pinion 21, the escapement wheel 25, and the anchor 26 will act to retard the turning of the ring 20 by the spring 32. The spring 19 turns the ring 18 in a counterclockwise direction, as viewed in FIG. 12, so as to maintain the pin 18a in engagement with the arm of the ring 20, and thus the turning ring 18 will produce axial movement of the lens carrier 28 by riding of the cam follower 28a on the cam 27a, and this movement is transmitted by the transmission train 29, lever 30, plate 8, and reflector 7, to the latter reflector so that the angular position of the reflector 7 changes simultaneously with the focusing adjustment of the objective. The train of motion-transmitting elements remains in movement until the pair of image sections received by the pair of photosensitive transducers 5 and 6 have the same brightness, and at this time the electrical circuit 11 will place the pointer 12a of the galvanometer 12 in its zero position where it provides an electrical connection between the contacts 13 and 14 so as to close the circuit 15. Thus, the electromagnet 16 is energized and attracts the armature 17a so as to turn the pawl 17 into engagement with the teeth 18 and thus the movement of the assembly is terminated when the objective has reached its focused position. In other words, since the adjusting ring 18 is connected with the carrier 28 for the front lens 33 as well as with the focusing cam follower 28a, the turning of the ring 18 has by cooperation of the cam follower 28a and the focusing cam 27a resulted in axial movement of the front lens 33 which serves to focus the objective. The transmission train which includes the escapement wheel 25 and the anchor 26 enables the tensioned ring 20 to continue its movement in a retarded manner, so that the arm 20a of the ring 20 engages the pin 24a to turn the lever 24 in a clockwise direction, as viewed in FIG. 12, thus releasing the shutter in order to make an exposure, and with the above-described structure the release of the shutter cannot take place until after the focusing adjustment has been completed. Upon release of the shutter the ring 20 turns to its end position where the arm which is connected to the spring 32 engages a stop pin 34. At the same time the subsequent transportation of the film will act through the pinion 21 on the ring 20 to tension the latter so that the parts are again returned to their position providing the necessary preparation for the next exposure. Of course, the return of the objective to its starting position will result in the displacement of the reflector 7 so that the galvanometer will have its pointer 12a move away from the contacts 13 and 14 and thus the circuit 15 will open and pawl 17 will move away from the ring 18. When the arm 20a engages the pin 24a in order to turn the lever 24 so as to release the shutter ring 22, the portion of the ring 20 which previously engaged the pin 22a is sufficiently displaced from the latter to permit the shutter to carry out its complete operation in order to make an exposure.

The release lever 23 will advantageously serve as the shutter release element of the camera. A control of the exposure can take place in a conventional manner according to which the angular position of the moving coil of a galvanometer will be scanned so as to determine the proper camera settings to make a proper exposure under the prevailing lighting conditions. With such an exposure control the control ring or disc which actuates the exposure-determining elements, such as the diaphragm and/or exposure time setting structure, will be released for movement until it is stopped in accordance with the position of the moving coil of the galvanometer. Thus, it is possible to provide an arrangement where both controls, namely the controls for exposure and the controls for focusing, include elements which are released to follow the movement of the same release elements which can cooperate with both of these control assemblies.

Naturally, the invention is not limited to the control structures shown in the drawings and described above. Thus, the range finder structure can position a suitable pointer whose position is determined by the adjustment of the range finder and the position of this pointer can be scanned with a structure which determines the adjustment of the objective, this adjustment taking place after balancing of the electrical system, and a spring or electric motor drive can be used for this purpose. Also, it is possible to arrange in front of individual transducer pairs or in front of individual surface portions of the transducers in both of the range finder objective light beams the very same color filters for the purpose of providing limited areas of the transducers which are sensitive to the light which passes through the objectives of the range finder of the invention.

It will be understood that each of the elements described above, or two or more together, may also find a useful application in other types of cameras differing from the types described above.

While the invention has been illustrated and described as embodied in camera range finders, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a range finder, in combination, a pair of optical means respectively situated adjacent the junctions between the base of a predetermined triangle and the sides thereof, said sides of said triangle intersecting distant from said base at the subject and said sides of said triangle respectively coinciding with the optical axes of said pair of optical means; a pair of photosensitive transducers respectively receiving light from beams which extend along said optical axes, said photosensitive transducers constructed and arranged so as to effect the production of equal signals only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different signals will be effected; and means for comparing the thus produced signals for determining their relative characteristics.

2. In a range finder which is built into a camera, in combination, a pair of optical means respectively situated adjacent the junctions between the base of a predetermined triangle and the sides thereof, said sides of said triangle inersecting distant from the base at the subject which is to be photographed and said sides of said triangle respectively coinciding with the optical axes of said pair of optical means, said pair of optical means respectively having viewing angles smaller than the viewing angle of the objective of the camera; a pair of photosensitive transducers respectively located along said optical axes to receive light from beams which extend along said axes, respectively, said photosensitive transducers constructed and arranged so as to effect the production of equal signals only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different signals will be effected; and means for comparing the thus produced signals for determining their relative characteristics.

3. In a range finder which is built into a camera, in combination, a pair of optical means respectively situated adjacent the junction between the base of a predetermined triangle and sides thereof, said triangle sides intersecting distant from said base at the subject which is to be photographed and said triangle sides respectively coinciding with the optical axes of said pair of optical means; a pair of photosensitive transducers respectively receiving light from beams which extend along said optical axes, said photosensitive transducers constructed and arranged so as to effect the production of equal signals only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different signals will be effected; means for comparing the thus produced signals for determining their relative characteristics; and means carried by the camera for providing visible images of the subject along said optical axes.

4. In a range finder, in combination, a pair of optical means respectively situated adjacent the junctions between the base of a predetermined triangle and sides thereof, said triangle sides respectively intersecting distant from said base at the subject and said triangle sides respectively coinciding with the optical axes of said pair of optical means; a pair of photosensitive transducers respectively receiving light from beams which extend along said pair of optical axes, each of said transducers having an effective transducer surface composed only of irregular, interrelated portions of the viewing field provided by each optical means, said photosensitive transducers constructed and arranged so as to effect the production of equal signals only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different signals will be effected; and means for comparing said signals to provide at least an indication of the range of the subject.

5. In a range finder, in combination, a pair of optical means respectively situated adjacent the junctions between the base of a predetermined triangle and the sides thereof, said triangle sides respectively intersecting distant from said base at the subject, and said sides of said triangle respectively coinciding with the optical axes of said pair of optical means; a pair of photosensitive transducers respectively receiving light from beams extending along said optical axes in viewing fields respectively provided by said pair of optical means, said photosensitive transducers constructed and arranged so as to effect the production of equal signals only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different signals will be effected, each of said viewing fields of each photosensitive transducer being divided into a plurality of small sections with each pair of sections of each transducer interrelated with respect to each other and with respect to the viewing field, as well as in size and electrical properties in precisely the same way; and means for comparing the thus produced signals for determining their relative characteristics.

6. In a range finder, in combination, a pair of optical means respectively situated adjacent the junctions between the base of a predetermined triangle and the sides thereof, said triangle sides intersecting distant from said base at the subject, and said triangle sides respectively coinciding with the optical axes of said pair of optical means, said pair of optical means respectively providing viewing fields which are the same as the viewing field of an objective of a device with which the range finder is associated; a pair of photosensitive transducers respectively receiving light which is derived from beams which respectively pass along said optical axes, said photosensitive transducers constructed and arranged so as to effect the production of equal signals only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different signals will be effected, said transducers respectively encompassing the same viewing fields as said objective and each transducer being divided into a plurality of geometrical areas the total of which provide the entire viewing field and the division of said transducers into said areas being respectively identical; and means for comparing the thus produced signals for determining their relative characteristics.

7. In a range finder, in combination, a pair of optical means respectively situated adjacent the junctions between the base of a predetermined triangle and the sides thereof, said sides respectively intersecting distant from said base at the subject, and said triangle sides respectively coinciding with the optical axes of said pair of optical means; and a pair of photosensitive transducers respectively receiving light from beams which respectively extend along said optical axes, said transducers respectively having areas corresponding to viewing fields provided by said pair of optical means and each of said areas being divided into a plurality of sections with the sections of one of said transducers being identical with the sections of the other of the transducers so that the sections of said one transducer form with the sections of the other transducer a plurality of pairs of identical sections; and a plurality of balancing circuit means each of which has a pair of legs which include said pair of identical sections from said pair of transducers.

8. In a range finder, in combination, a pair of optical means respectively situated adjacent the junctions between the base of a predetermined triangle and the sides thereof, said sides intersecting distant from said base at the subject and said sides of said triangle respectively coinciding with the optical axes of said pair of optical means; and a pair of photosensitive transducers respectively receiving light from beams which respectively extend along said optical axes, said pair of optical means respectively providing viewing fields for said pair of transducers and said transducers respectively being divided into a number of sections with the number of sections of one transducer being identical with the number of sections of the other transducer both as to the number of said sections and the configurations thereof, so that for every section of one transducer there is an identical section at the other transducer, thus forming pairs of identical transducer sections; and a plurality of balancing bridge circuits respectively connected in series with each other and respectively having pairs of legs which include said pairs of identical transducer sections, respectively.

9. In a range finder, in combination, a pair of optical means respectively situated adjacent the junctions between the base of a predetermined triangle and the sides thereof, said triangle sides intersecting distant from said base at the subject, and said triangle sides respectively coinciding with the optical axes of said pair of optical means; a pair of photosensitive transducers respectively receiving from said pair of optical means light which passes along the optical axes thereof, said pair of optical means respectively providing identical viewing fields for said pair of transducers and said transducers respectively being divided into identical sections where the number and configuration of the sections of one transducer are precisely the same as the number and configurations of the sections of the other transducer so that for every section of one transducer there is an identical section at the other transducer, thus forming a plurality of pairs of identical transducer sections; and a plurality of alternating current balancing bridge circuits respectively having legs formed by said pairs of identical transducer sections, said circuits respectively including rectifier means.

10. In a camera and range finder therefor, in combination, an objective of the camera adapted to be focused on a given subject; a pair of optical means respectively situated adjacent the junctions between a base of a predetermined triangle and sides thereof, said sides intersecting distant from said base at the subject on which the objective is to be focused and said triangle sides respectively coinciding with the optical axes of said pair of optical means, said pair of optical means forming part of the range finder of the camera; and a pair of photosensitive transducers respectively receiving light from said pair of optical means and respectively divided into sections where the sections of one transducer are identical in number and configuration with the sections of the other transducer to form pairs of identical transducer sections; and a plurality of balancing bridge circuits respectively including said pairs of identical transducer sections for indicating when balanced between said transducers is achieved so as to focus said objective, only one of said transducers being used for focusing the objective.

11. In a camera and range finder therefor, in combination, an objective of the camera adapted to be focused on a given subject; a pair of optical means respectively situated adjacent the junctions between a base of a predetermined triangle and sides thereof, said sides intersecting distant from said base at the subject on which the objective is to be focused and said triangle sides respectively coinciding with the optical axes of said pair of optical means, said pair of optical means forming part of the range finder of the camera; a pair of photosensitive transducers respectively receiving light from said pair of optical means and respectively divided into sections where the sections of one transducer are identical in number and configuration with the sections of the other transducer to form pairs of identical transducer sections; and a plurality of balancing bridge circuits respectively including said pairs of identical transducer sections for indicating when balance between said transducers is achieved so as to focus said objective, only one of said transducers being used for focusing the objective; manually operable means for selectively energizing one of said balancing bridge circiuts; and means for indicating the field section of the energized circuit in a viewfinder.

12. In a camera, in combination, a range finder assembly including a pair of optical means respectively situated adjacent the junctions between the base of a predetermined triangle and the sides thereof, said triangle sides intersecting at the subject and respectively coinciding with the optical axes of said pair of optical means, one of said optical means being adjustable for positioning the optical axis of said one optical means and the side of the triangle coinciding therewith at a location intersecting with the other side of the triangle at the subject; a manually adjustable objective forming the picture-taking objective of the camera; means coupling said one adjustable optical means to said camera objective for adjusting the latter simultaneously with the adjustment of said one optical means; a pair of photosensitive transducers respectively having viewing fields provided by said pair of optical means; balancing bridge circuit means operatively connected with said transducers for providing a balance when said transducers have the same electrical enregy, said circuit means including an indicator for indicating when balance is achieved; and means rendering said indicator visible to the operator so that when the operator adjusts said one optical means until balance is achieved the camera objective will be automatically focused on the subject.

13. In a camera, in combination, a range finder assembly including a pair of optical mean respectively situated adjacent the junctions between the base of a predetermined triangle and the sides thereof, said triangle sides respectively coinciding with the optical axes of said pair of optical means and intersecting distant from said base at the subject; a picture-taking objective; transmission means operatively connected to said objective and one of said optical means for simultaneously adjusting said one optical means and said objective; electric motor means operatively connected to said transmission means for driving the latter; a pair of photosensitive transducers respectively receiving light from said pair of optical means; and balancing bridge circuit means operatively connected to said transducers and to said motor for energizing the latter to drive said one optical means and said objective until balance is achieved between said transducers, whereby said objective will be automatically focused on a subject located at the intersection between said sides of said triangle.

14. In a camera, in combination, a picture-taking objective; a range finder assembly including a pair of optical means respectively situated adjacent the junctions between the base of a predetermined triangle and the sides thereof, one of said optical means being adjustable for determining the inclination of one of the sides of said triangle, said triangle sides respectively coinciding with the optical axes of said pair of optical means and intersecting distant from said base at the subject which is to be photographed; a pair of photosensitive transducers respectively receiving light from said pair of optical means; balancing circuit means operatively connected to said photosensitive transducers for indicating when balance is achieved therebetween; and spring means operatively connected to said objective for automatically focusing the latter at a distance determined by the positions of said pair of optical means relative to each other when balance is achieved.

15. In a camera, in combination, a range finder assembly including a pair of optical means respectively situated adjacent the junction between the base of a predetermined triangle and the sides thereof, said triangle sides intersecting distant from the base at the subject and respectively coinciding with the optical axes of said pair of optical means; a pair of photosensitive transducers respectively receiving light from said pair of optical means; balancing circuit means operatively connected to said transducers; meter means operatively connected to said balancing circuit means for indicating when balance is achieved, said meter means including a turnable pointer; scanning means for scanning the position of said pointer; an adjustable camera objective; and spring means operatively connected to said objective for adjusting the latter to a position determined by said scanning means, whereby the objective can be automatically focused on a given subject.

16. In a camera, in combination, a range finder assembly including a pair of optical means respectively situated adjacent the junction between the base of a predetermined triangle and the sides thereof, said triangle sides intersecting distant from the base at the subject and respectively coinciding with the optical axes of said pair of optical means; a pair of photosensitive transducers respectively receiving light from said pair of optical means; balancing circuit means operatively connected to said transducers; meter means operatively connected to said balancing circuit means for indicating when balance is achieved, said meter means including a turnable pointer; scanning means for scanning the position of said pointer; an adjustable camera objective; spring means operatively connected to said objective for adjusting the latter to a position determined by said scanning means, whereby the objective can be automatically focused on a given subject; and means operatively connected to said objective for returning the latter to a predetermined starting position where said spring means is tensioned.

17. In a camera, in combination, a range finder assembly including a pair of optical means respectively situated adjacent the junction between the base of a predetermined triangle and the sides thereof, said triangle sides intersecting distant from the base at the subject and respectively coinciding with the optical axes of said pair of optical means; a pair of photosensitive transducers respectively receiving light from said pair of optical means; balancing circuit means operatively connected to said transducers; meter means operatively connected to said balancing circuit means for indicating when balance is achieved, said meter means including a turnable pointer; scanning means for scanning the position of said pointer; an adjustable camera objective; spring means operatively connected to said objective for adjusting the latter to a position determined by said scanning means, whereby the objective can be automatically focused on a given subject; means operatively connected to said objective for returning the latter to a predetermined starting position where said spring means is tensioned; and shutter release means carried by the camera for making an exposure, said shutter release means releasing said objective to said spring means for focusing said objective prior to opening of the shutter to make an exposure.

18. In a camera as recited in claim 17, exposure control means actuated by said shutter release means for controlling the extent to which film in the camera is exposed.

19. In a camera, in combination, a range finder assembly including a pair of optical means respectively situated adjacent the junction between the base of a predetermined triangle and the sides thereof, said triangle sides intersecting distant from the base at the subject and respectively coinciding with the optical axes of said pair of optical means; a pair of photosensitive transducers respectively receiving light from said pair of optical means; balancing circuit means operatively connected to said transducers; meter means operatively connected to said balancing circuit means for indicating when balance is achieved, said meter means including a turnable pointer; scanning means for scanning the position of said pointer; an adjustable camera objective; spring means operatively connected to said objective for adjusting the latter to a position determined by said scanning means, whereby the objective can be automatically focused on a given subject; means operatively connected to said objective for returning the latter to a predetermined starting position where said spring means is tensioned; shutter release means carried by the camera for making an exposure, said shutter release means releasing said objective to said spring means for focusing said objective prior to opening of the shutter to make an exposure; and retarding means operatively connected to said shutter release means for retarding the operation thereof until after the objective has been focused.

20. In a camera, in combination, a range finder assembly including a pair of optical means respectively situated adjacent the junction between the base of a predetermined triangle and the sides thereof, said triangle sides intersecting distant from the base at the subject and respectively coinciding with the optical axes of said pair of optical means; a pair of photosensitive transducers respectively receiving light from said pair of optical means; balancing circuit means operatively connected to said transducers; meter means operatively connected to said balancing circuit means for indicating when balance is achieved, said meter means including a turnable pointer; scanning means for scanning the position of said pointer; an adjustable camera objective; and spring means operatively connected to said objective for adjusting the latter to a position determined by said scanning means, whereby the objective can be automatically focused on a given subject, said circuit means placing said pointer in a zero position when said pointer is scanned by said scanning means.

21. In a camera, in combination, a range finder assembly including a pair of optical means respectively situated adjacent the junction between the base of a predetermined triangle and the sides thereof, said triangle sides intersecting distant from the base at the subject and respectively coinciding with the optical axes of said pair of optical means; a pair of photosensitive transducers respectively receiving light from said pair of optical means; balancing circuit means operatively connected to said transducers; meter means operatively connected to said balancing circuit means for indicating when balance is achieved, said meter means including a turnable pointer; scanning means for scanning the position of said pointer; an adjustable camera objective; and spring means operatively connected to said objective for adjusting the latter to a position determined by said scanning means, whereby the objective can be automatically focused on a given subject, said pointer being coupled with said range finder assembly and having a position proportional to the balanced position of said circuit.

22. In a camera, in combination, an adjustable picture-taking objective; a pair of stationary optical means respectively situated adjacent the junctions between the base of a predetermined triangle and the sides thereof, the sides of said triangle intersecting distant from said base at the subject and respectively coinciding with the optical axes of said pair of optical means; a pair of photosensitive transducers respectively receiving light from said pair of optical means and providing in accordance with the parallax between said transducers an electrical impulse capable of being used for focusing the objective, said photosensitive transducers constructed and arranged so as to effect the production of equal impulses only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different impulses will be effected; and means for comparing said impulses for determining the range of the subject, said impulse being indicative of the range of the subject.

23. In a camera, in combination, adjustable picture-taking objective means; a range finder assembly including a pair of optical means respectively situated adjacent the junctions between the base of a predetermined triangle and the sides thereof, said triangle sides coinciding with the optical axes of said pair of optical means and one of said optical means being adjustable for determining the intersection between one side of the triangle and the other so that said inersection can be located at the subject which is to be photographed; mechanical means coupling said one adjustable optical means with said objective means; a pair of photosensitive transducers respectively receiving light from said pair of optical means; balancing bridge circuit means connected electrically with said transducers for indicating when balance is achieved therebetween; a solenoid connected electrically with said circuit means to be energized thereby when balance is achieved; and pawl-and-ratchet means operatively connected to the objective means and said solenoid to be actuated by the latter for arresting the adjustment of the objective means during movement of said one optical means when balance of said circuit means is achieved.

24. In a camera, in combination, an adjustable picture-taking objective; a range finder assembly including a stationary optical means and a movable optical means forming a pair of optical means, said stationary and movable optical means being respectively situated adjacent the junctions between a base of a predetermined triangle and the sides thereof, said triangle sides coinciding with the optical axes of said pair of optical means so that said movable optical means can determine the inclination at which one of the sides of the triangle intersects the other side thereof at the subject; a pair of photosensitive transducers respectively receiving light from said pair of optical means; a third, stationary optical means, both of said stationary optical means determining the direction of adjustment of the objective in accordance with the light sensed thereby while said pair of optical means determine the extent of adjustment of the objective for focusing the latter on a given subject.

25. In a range finder, in combination, a pair of optical means respectively situated adjacent the junctions between the base of a predetermined triangle and the sides thereof, the sides of said triangle intersecting distant from said base at the subject and respectively coinciding with the optical axes of said pair of optical means; a pair of photosensitive transducers respectively receiving light from said pair of optical means; color filter means arranged in front of the sensitive surfaces of said transducers and covering predetermined sections thereof in precisely the same way, said photosensitive transducers constructed and arranged so as to effect the production of equal signals only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different signals will be effected; and means for comparing the thus produced signals for determining their relative characteristics.

26. In a range finder, in combination, a pair of optical means respectively situated adjacent the injunction between the base of a predetermined triangle and the sides thereof, said sides of said triangle intersecting distant from said base at the subject and respectively coinciding with the optical axes of said pair of optical means; a pair of photosensitive transducers respectively receiving light from said pair of optical means, said photosensitive transducers constructed and arranged so as to effect the production of equal signals only in response to impingement of identical light beams of equal intensity and equal configuration in identical locations on said photosensitive transducers while in the event of impingement of light beams of unequal intensity and equal configuration in identical locations or of equal intensity and equal or unequal configuration in different locations on said photosensitive transducers the production of different signals will be effected; balancing bridge circuit means connected electrically with said transducers for comparing said signals to provide at least an indication of the range of the subject; a fixed resistor connected in series with said circuit means; and a photosensitive resistor connected in parallel with said circuit means.

References Cited by the Examiner
UNITED STATES PATENTS

| | | | |
|---|---|---|---|
| 2,968,994 | 1/1961 | Shurcliff | 88—24 |
| 3,143,588 | 8/1964 | Donald | 88—1 |

JOHN M. HORAN, *Primary Examiner.*